United States Patent [19]
Vicknair et al.

[11] Patent Number: 5,184,064
[45] Date of Patent: Feb. 2, 1993

[54] ENCAPSULATED METER WITH OPTICAL PROGRAMMER

[75] Inventors: Bruce A. Vicknair, Baytown; Robert A. Baten, Houston, both of Tex.

[73] Assignee: Stewart & Stevenson Services, Inc., Houston, Tex.

[21] Appl. No.: 675,368

[22] Filed: Mar. 25, 1991

[51] Int. Cl.⁵ .................... G01R 1/04; G01R 21/00; H05K 5/06; G01D 11/24
[52] U.S. Cl. .................... 324/156; 73/431; 174/52.2; 264/272.14; 324/110; 324/142; 324/157; 340/870.02; 361/364; 364/483; 364/510
[58] Field of Search ................ 324/96, 110, 116, 142, 324/156, 157; 264/272.11, 272.14, 272.15; 73/431; 361/364, 369; 340/870.02; 174/52.2; 336/96; 368/280, 283, 286, 289, 291; 455/89, 90, 128, 347; 364/483, 509–511

[56] References Cited

U.S. PATENT DOCUMENTS

| | | | |
|---|---|---|---|
| 3,846,677 | 11/1974 | Keever et al. ................ | 361/364 |
| 3,868,853 | 3/1975 | Alinari ................ | 73/431 X |
| 4,011,398 | 3/1977 | Munz et al. ................ | 174/52.2 |
| 4,136,357 | 1/1979 | Frederiksen ................ | 174/52.2 X |
| 4,194,351 | 3/1980 | Kume et al. ................ | 368/286 X |
| 4,298,839 | 11/1981 | Johnston ................ | 324/157 |
| 4,467,434 | 8/1984 | Hurley et al. ................ | 324/142 X |
| 4,584,527 | 4/1986 | Amigo ................ | 324/157 |
| 4,600,969 | 7/1986 | Hendrickson ................ | 174/52.2 X |
| 4,710,797 | 12/1987 | Tanaka ................ | 174/52.2 X |
| 5,039,942 | 8/1991 | Buchschmid et al. ................ | 174/52.2 X |

FOREIGN PATENT DOCUMENTS

| | | | |
|---|---|---|---|
| 2417915 | 10/1979 | France ................ | 174/52.2 |
| 2221993 | 2/1990 | United Kingdom ................ | 324/110 |

Primary Examiner—Gerard R. Strecker
Attorney, Agent, or Firm—David A. Rose

[57] ABSTRACT

A totalizer and rate meter is totally enclosed within a permanently sealed, fluid tight body formed of a low cost, transparent epoxy material. The meter can be programmed in the field by means of an optical transmitter communicating with an optical receiver enclosed within the transparent body of the meter.

23 Claims, 9 Drawing Sheets

ENCAPSULATED METER WITH OPTICAL PROGRAMMER

BACKGROUND OF THE INVENTION

The present invention relates generally to a meter for accumulating and processing electric signals and for providing an output indicative of a measured parameter, and more particularly to a programmable meter forming a part of an instrument panel for accumulating totals and rates of change in a measured parameter. Still more particularly, the present invention relates to a programmable, environmentally sealed meter used as part of an instrument panel in a measurement control center to indicate total amounts or rates of change in a measured parameter.

Totalizer and rate meters are used extensively in a variety of industries to provide a visual indication of a measured parameter. For example, totalizer and rate meters may be used on fluid flow lines in cooperation with flowmeters to indicate the total volume of fluid flowing past the flowmeter, as well as the rate of fluid flow. Typically, a totalizer/rate meter receives a series of electronic pulses generated by a source transducer, such as a flowmeter, and calculates and displays from that pulse stream the total and rate of change, expressed in the desired unit of measure.

Often, a totalizer/rate meter is exposed to a harsh and potentially destructive environment. For example, totalizer/rate meters are employed outdoors on fluid flow lines in hydrocarbon processing plants. Such meters must be encased in an environmentally sealed enclosure to prevent invasion of the various fluids to which the meters are exposed on almost a daily basis. The environmentally sealed enclosures typically are expensive to manufacture and constitute a significant portion of the cost of such meters.

From time to time, it is desirable to reprogram a totalizer/rate meter to change, for example, the units of measure displayed by the meter, the sensitivity of the meter to input signals, the frequency at which the meter display is updated, or some other feature of the meter. Reprogramming can be a significant, time-consuming problem housed within an environmentally sealed enclosure. Such meters necessarily require either an expensive, hermetically sealed connector or a certain amount of disassembly, or both, in order to gain access to the electronic or mechanical apparatus that must be altered to effect the desired changes to the operation of the meter. In addition, because the environmentally sealed enclosure must be opened, the reprogramming operation exposes the sensitive internal parts of the meter to possible environmental contamination.

Thus, it would be desirable to provide a totalizer/rate meter enclosed within a relatively inexpensive, environmentally sealed enclosure and capable of being reprogrammed rapidly, without violating the integrity of the enclosure.

SUMMARY OF THE INVENTION

Accordingly, the present invention comprises a meter fully encapsulated and hermetically sealed within a transparent body, having means for programming the meter by optical signal communication through the transparent body. The encapsulated body enclosure can be molded from a relatively inexpensive epoxy compound, significantly reducing the manufacturing cost of the meter. The optical programming means enables the meter to be programmed rapidly, for example, in less than one minute, by means of a hand-held optical transmitter, without need for disassembling the meter enclosure or exposing the internal electronics of the meter to the surrounding environment.

BRIEF DESCRIPTION OF THE DRAWINGS

For a detailed description of the preferred embodiment of the invention, reference will be made now to the accompanying drawings, wherein.

DETAILED DESCRIPTION OF THE PREFERRED EMBODIMENT

Totalizer/rate meters designed for exterior application in relatively harsh environments typically include an environmentally sealed enclosure that is relatively expensive to construct. When such meters are reprogrammed from time to time, a technician must disassemble the enclosure and effect changes to the electronic or mechanical parts therein. Disassembly of the meters and/or the panels supporting the meters is time-consuming and exposes the sometimes delicate internal parts of the meter to potentially hazardous fluids in the surrounding environment. A meter constructed in accordance with the principles of the present invention solves these problems by providing a hermetically sealed body enclosure molded from a transparent epoxy and means for programming the meter by optical signal communication.

More particularly, FIGS. 1-4 depict the preferred embodiment of a meter 100 constructed in accordance with the principles of the present invention. The meter 100 includes a transparent body 200, an electronic processing system 300, an electronic display 400, and an electrical connector strip 500, all as further described in detail hereafter.

The Transparent Body

The transparent body 200 preferably is sized to conform to the dimensions of totalizer/rate meters in frequent use on instrument panels in various field applications. Alternatively, the body 200 may be constructed smaller than as described herein in order to obtain a meter with an overall smaller body size. Thus, the body 200 includes a front portion 210 and a rear portion 220. The front portion 210 is generally rectangular in shape as viewed in front elevation (FIG. 2), with a width preferably measuring approximately 3.94 inches, a heighth preferably measuring approximately 2.88 inches, and a depth preferably measuring approximately 0.81 inch.

The front portion 210 of the body 200 includes a viewing window 212 and four generally cylindrical recesses 214a-d, each receiving therein a stainless steel insert 216a-d. The viewing window 212 is molded as a part of the body 200 and protrudes forwardly of the front portion 210 preferably approximately 0.13 inch. The viewing window 212 is designed to conform the meter 100 to standard sized instrument panels in which the viewing window 212 will fit within a cutout in the instrument panel. Thus, the viewing window 212 preferably measures approximately 2.23 inches in width and approximately 0.995 inch in heighth. As shown in the front elevation view depicted in FIG. 2, the viewing window 212 is positioned directly in front of the electronic display 400.

The stainless steel inserts 216a-d are double length, internally threaded inserts, preferably size 8-32UNC-2B, which receive screws for attachment of the meter 100 to an instrument panel. The inserts 216a-d include an integral ring extending radially from the center of the axial length of the insert, giving the inserts a pull strength of approximately 200 lbs. once they are molded into the body. Preferably, the inserts 216a-d are centered along the width of the front face of the front portion 210 of the body 200 (FIG. 2) on centerlines spaced 3.940 inches and are centered along the heighth of the front face on centerlines spaced 2.062 inches.

The rear portion 220 of the transparent body 200 includes a rear face 222, four tapered surfaces 224a-d connecting the rear face 222 to the front portion 210 of the body 200, a connector recess 226, and a pair of generally cylindrical bores 228a,b for receiving screws to attach the connector strip 500 to the processing system 300. The rear face 222 is generally rectangular shaped, as viewed in rear elevation (FIG. 3), preferably measuring approximately 3.25 inches in width and 1.25 inches in heighth. The rear face 222 is generally centered, as viewed in rear elevation (FIG. 3), within the profile of the front portion 210 of the body 200, with the tapered surfaces 224a-d connecting the front portion 210 to the rear face 222 and defining therewithin the rear portion 220. The tapered surfaces 224a-d reduce the volume of the body 200, thereby reducing the volume of transparent epoxy material required to form the body 200, as explained below.

Figure 3:
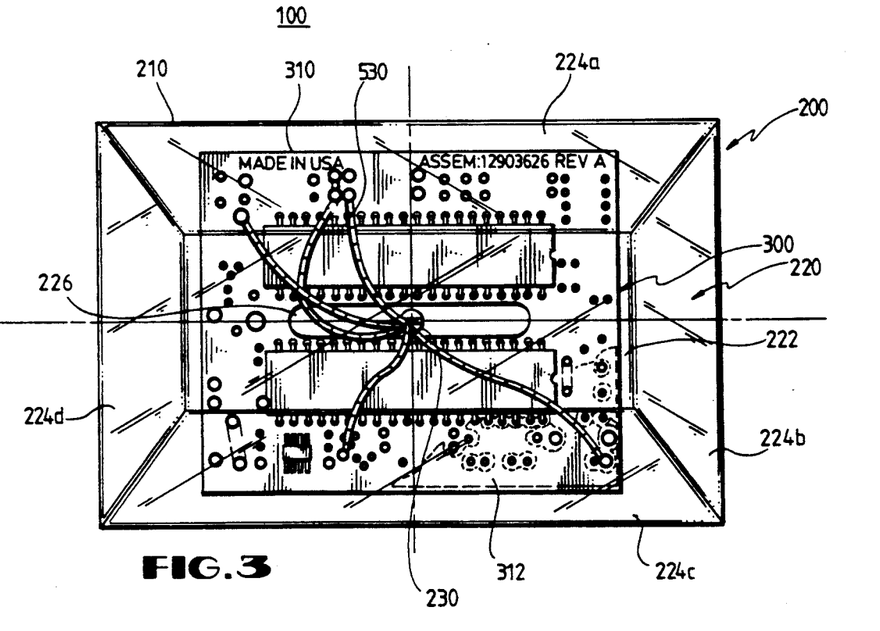
FIG. 3 depicts the meter of FIG. 1 in rear elevation, with an electrical connector strip removed therefrom to facilitate an understanding of the construction of the meter.

The connector recess 226 comprises an opening in the rear face 222 of the body 200 preferably sized to accommodate connector pins extending from the connector strip 500. Thus, the recess may be, for example, 1.75 inches in width, 0.25 inch in heighth, and 0.38 inch in depth, as viewed in rear elevation (FIG. 3). The cylindrical bores 228a,b are molded into the body 200, as further explained below. A small aperture 230 connects the connector recess 226 to the printed circuit board 310 to enable the electronic connector strip 500 to be connected electrically to the electronic processing system 300.

Electronic Processing System

Figure 4:
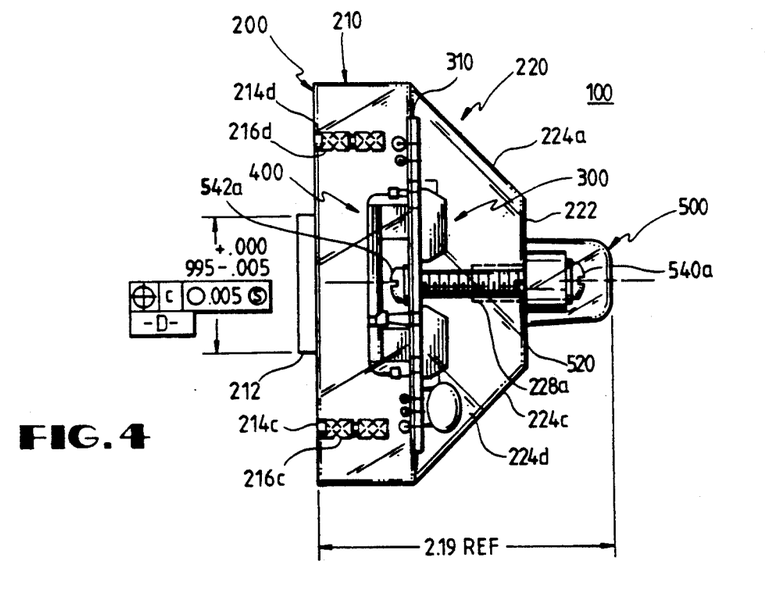
FIG. 4 depicts the meter of FIG. 1 fully assembled, in side elevation.
Figure 5:
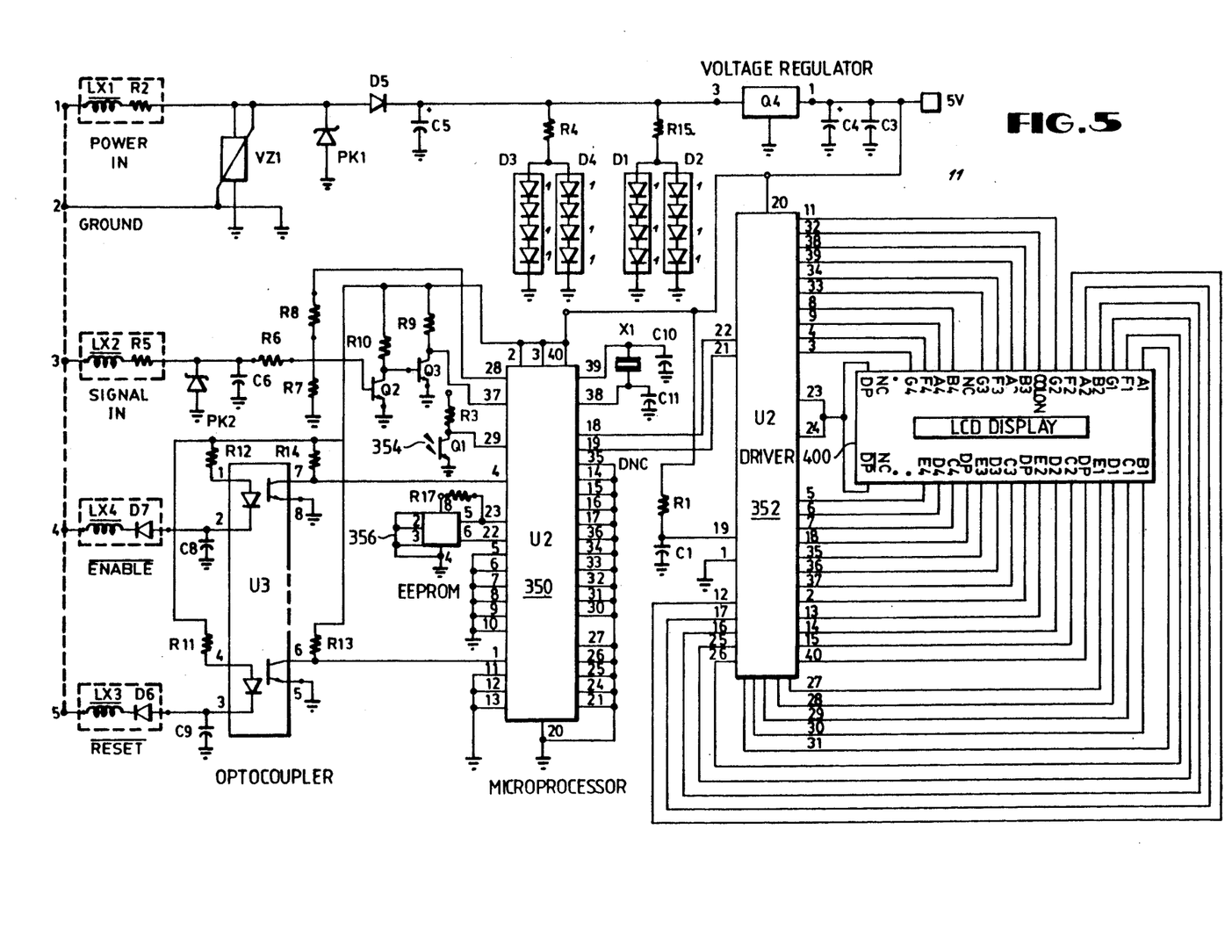
FIG. 5 is a schematic diagram of the electronic processing system forming a part of the meter shown in FIGS. 1-4.

The electronic processing system 300 comprises a single, dual-sided, four-layer printed circuit board 310 supporting a plurality of electronic components shown in the schematic diagram depicted in FIG. 5. Referring still to FIGS. 1-4, the printed circuit board 310 preferably comprises a multiple layered board having a copper foil layer 312, as shown partially in FIG. 3, applied to the opposed faces of the board 310. The outer copper foil layers 312 limit the adverse effects of radio frequency interference and electromagnetic interference on the operation of the processing system 300. The artwork for the board 310, other than the use of the outer copper foil layers 312, is designed by conventional methods to effect the schematic diagram depicted in FIG. 5 and described in detail below.

As shown in FIG. 5, the hardware comprising the electronic processing system 300 includes a microprocessor 350 communicating electrical signals to a display driver 352, which powers the electronic display 400. In operation, the microprocessor 350, which operates in either a totalizer mode or a rate mode, receives a series of digital pulses via terminal 3 (of the connector strip), which is connected to an external transducer, for example, a flowmeter. The microprocessor 350 is programmed, as explained below, to convert the input pulses to a measured quantity, to communicate that data to the driver 352, and to cause the driver to update the display at a predetermined frequency.

In accordance with the principles of the present invention, the microprocessor 350 may be reprogrammed to vary its mode of operation by means of infrared frequency optical signals transmitted serially from an optical transmitter (not shown), for example, a hand-held transmitter unit carried by a field technician, and detected by an optical receiver 354. Data detected by the optical receiver 354 is communicated through the microprocessor 350 to an EEPROM 356, having an 8,000 byte storage capacity, for storage therein for later use. As further explained in some detail below, the microprocessor 350 routinely retrieves the data stored in the EEPROM 356 in the process of converting the digital pulse train to a total or rate of a measured quantity and displaying the same.

Figure 1:
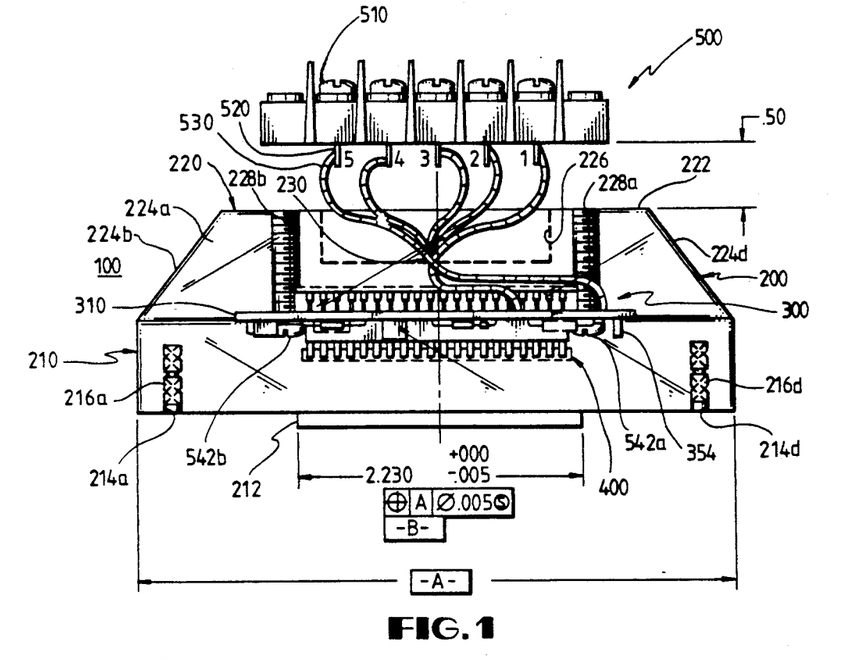
FIG. 1 is a top view of a meter, partially disassembled, constructed in accordance with the principles of the present invention, with internal parts thereof visible through the body of the meter.
Figure 2:
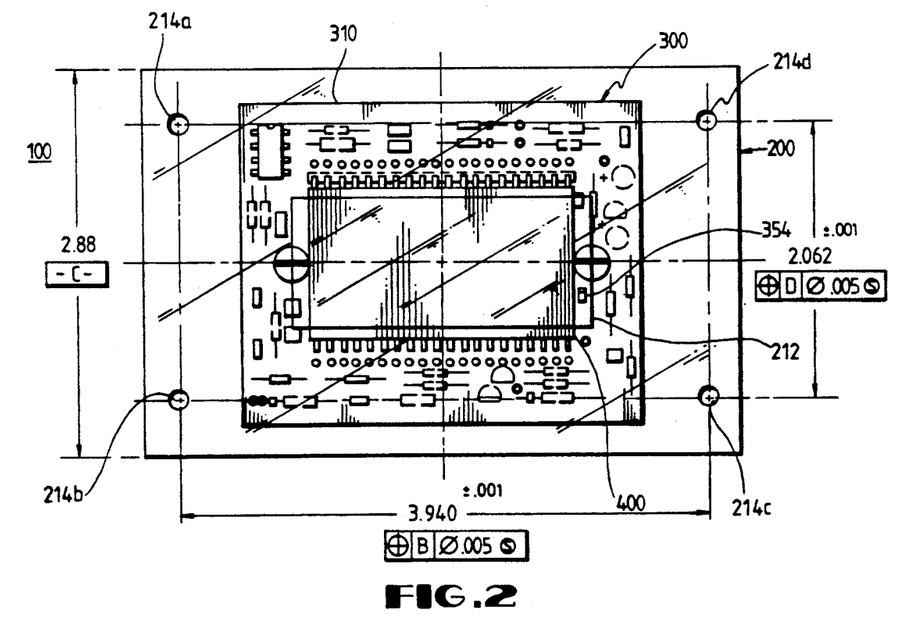
FIG. 2 depicts the meter of FIG. 1 in front elevation.

Referring briefly to FIG. 2, the optical receiver 354 is mounted on the front face of the printed circuit board 310 in such a position as to be visible through the viewing window 212 of the transparent body 200. A field technician can thereby communicate optical signals from an optical transmitter to the optical receiver 354 through the front face of the meter 100 while it is mounted within an instrument panel. Access to the rear panel of the meter 100 is not required.

Table I in the Appendix identifies the various electrical devices shown in the schematic diagram depicted in FIG. 5. The theory of operation of the meter 100 and the preferred manner of programming the microprocessor 350 is described below in the section entitled, "Theory of Operation."

The Electronic Display

The electronic display 400 of the meter 100 preferably comprises a four-digit, liquid crystal digital (LCD) display, such as Part No. 44R3F03KG manufactured by LXD, or its equivalent made by another manufacturer, such as Standish Industries.

The Electrical Connector Strip

Referring again to FIGS. 1-4, the electrical connector strip 500 includes five screw-type terminals 510 for electrically connecting the meter 500 to an external transducer. Each terminal 510 corresponds to an electrical pin 520, which is arranged for a solder-type connection to one of five wires 530 extending from the electronic processing system 300, as indicated in FIG. 3.

As shown in FIG. 4, a pair of screws 540a,b having threaded shafts extend from the terminal strip 500 into the cylindrical bores 228a,b within the transparent body 200 for threadedly engagement within female-type threads within cylindrical bores in the shafts of bolt members 542a,b extending rearwardly from the printed circuit board 310 and molded with the body 200. In this manner, the connector strip 500 is secured to the meter 100, with the electrical pins 520 housed within the recess 226 in the rear portion 220 of the body 200.

The terminals 510 on the connector strip 500 receive five connections from an external transducer. In the preferred embodiment, terminal 1 connects to a power source, terminal 2 connects to ground, terminal 3 receives the output signal from the transducer, terminal 4 connects to an enable line, and terminal 5 connects to a reset line.

Construction of the Meter

The transparent body 200 preferably is molded from a low cost, transparent, high impact, aliphatic casting resin manufactured and sold by Emerson & Cuming, Inc., a company owned by W. R. Grace & Co., under the trade name STYCAST 1267. The casting resin or epoxy selected for use preferably is transparent, has as long a pot life as possible, is resistant to corrosion in the presence of copper, has a relatively high dielectric constant (for example, 3.00), and has any other physical properties necessary to make it suitable for outdoor application.

The mold for the transparent body 200 preferably is formed by machining a model of the transparent body from a suitable material, such as aluminum. Using the model, a mold can be manufactured by coating the model with a releasing agent and pouring an epoxy around the model. Applicants have found that an aluminum-filled epox like that manufactured by Devcon Corporation works well for this purpose. The mold could also be investment cast for greater durability. Once the epoxy surrounding the model has cured, the cured epoxy can be cut off of the model in two pieces, a front half and a rear half.

Prior to molding of the transparent body 200, the stainless steel inserts 216a-d are attached to the front portion of the mold, and the printed circuit board 310 is secured in place within the mold by means of bolt members 542a,b connected to the rear portion of the mold. The five wires 530 connecting the printed circuit board 310 to the connector strip 500 are pulled through the aperture 230 and the aperture is sealed with a silicon sealant such as RTV compound no. 3140. The sealant compound should be allowed to set up before the epoxy forming the body 200 is poured into the mold in order to prevent the epoxy from escaping from the mold via the aperture 230.

Applicants have determined that the circuit board 310 should be positioned approximately in the plane defined by the interface between the front portion 210 and the rear portion 220 of the body 200, as shown in side elevation in FIG. 4. This position enables optimum curing of the particular epoxy selected for use in forming the transparent body 200. Applicants have also determined that one should use the lowest possible epoxy temperature in preparing the epoxy for molding.

Once the transparent body has been molded, it is removed from the mold and the five wires 530 are trimmed and soldered to the connector strip 500. Before the connector strip 500 is secured within the connector recess 226, a liberal amount of silicon sealant, such as RTV compound no. 3140, should be applied to the connector recess 226 and to the cylindrical bores 228a,b in the rear face of the body 200. Thus, when the connector strip 500 is secured to the rear face of the body, as described above, the electronic processing system 300 is completely sealed within the transparent body 200

Theory of Operation

Figure 6:
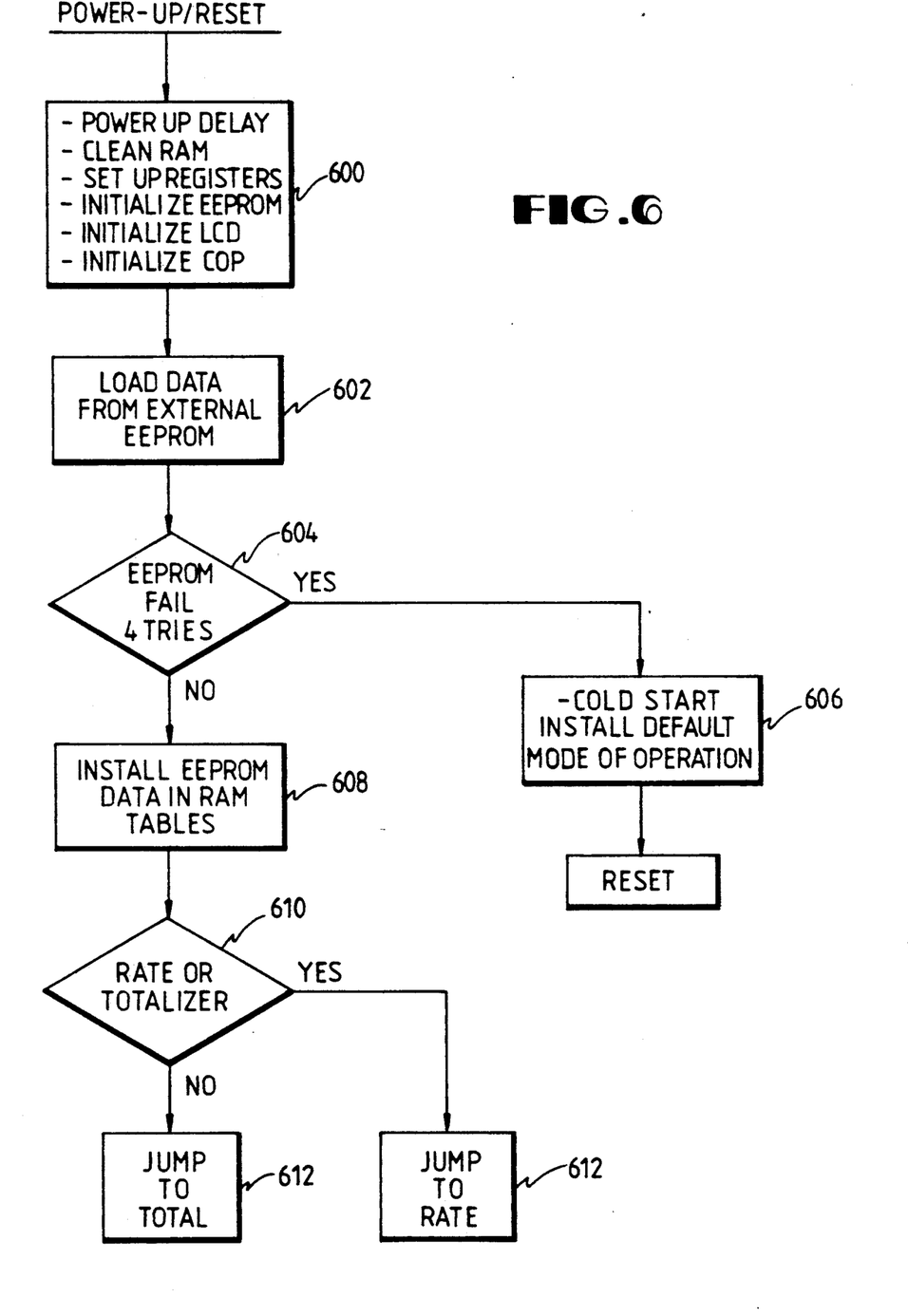
FIG. 6 is a flow chart describing the power-up sequence of operation of the software installed in a microprocessor in the electronic processing system depicted in FIG. 5.

FIGS. 6-10 are flow charts describing the basic operation of the software installed in the electronic processing system 300. Referring first to FIG. 6, the microprocessor steps through a series of power-up steps, as shown at 600, when power is first applied to the microprocessor. The microprocessor then attempts to load data from the EEPROM to the RAM within the microprocessor 602. If there is no data in the microprocessor 604, the system defaults to its "cold start" mode of operation 606, leaving the LCD display blank and awaiting the arrival of a data string, as described below, in the EEPROM.

If the EEPROM contains a data string, it is installed in the RAM tables within the microprocessor 608. The microprocessor then determines from the data string whether the meter is to operate in the rate mode or the totalizer mode 610, and operation continues in the appropriate routine 612.

Figure 7:
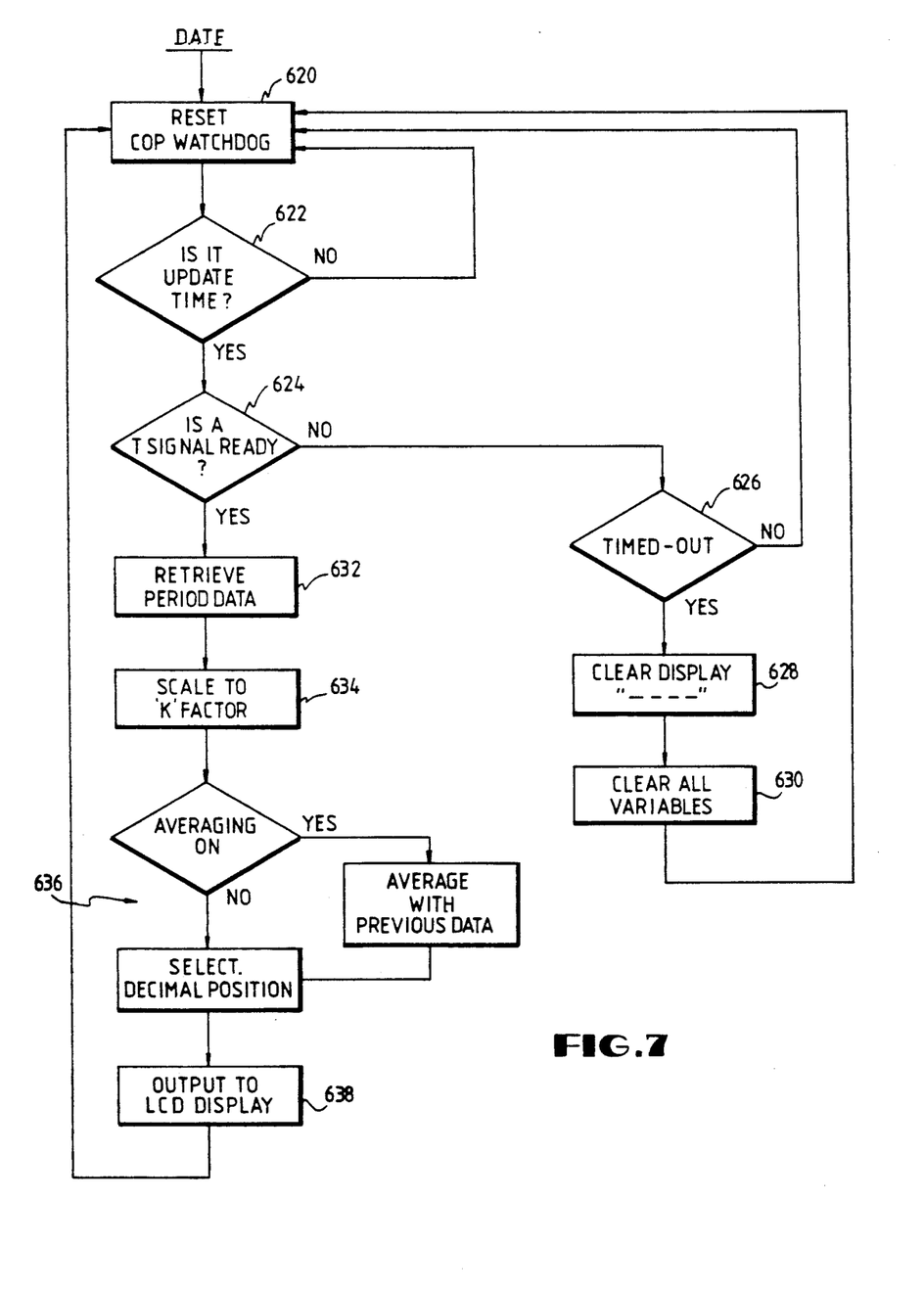
FIG. 7 is a flow chart illustrating the manner in which the microprocessor of the electronic processing system is programmed to operate in the rate mode.
Figure 11:
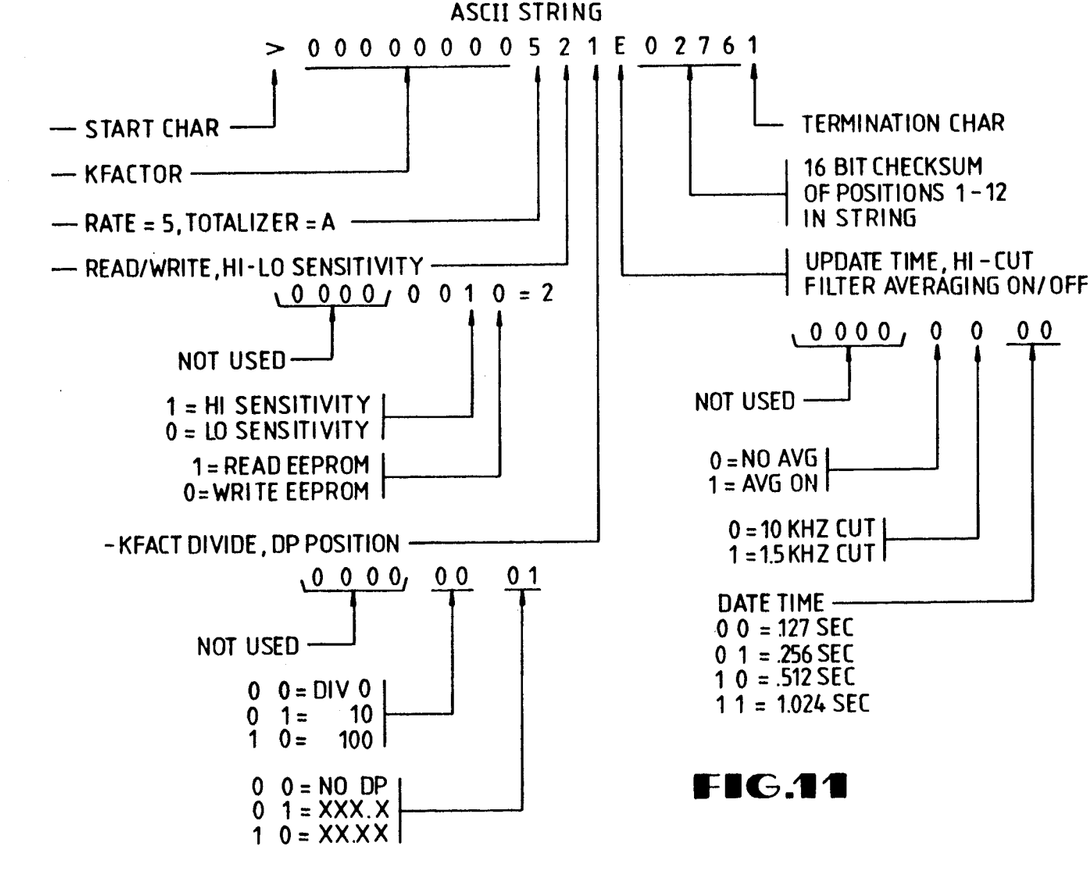
FIG. 11 is a diagram of the preferred embodiment of the ASCII data string delivered optically to the meter to reprogram its operation in the field.

FIG. 7 is a flow chart describing operation of the rate mode of the meter. This routine begins by resetting the watchdog feature of the microprocessor 620. Watchdog features are well known to those of ordinary skill in the art as a typical device for monitoring operation of a microprocessor-based control system. The microprocessor then checks a timer to determine whether the period has expired for updating the rate displayed on he LCD display 622. As shown in FIG. 11, the frequency at which the display is to be updated is software programmable through the data string delivered to the EEPROM.

Figure 9:
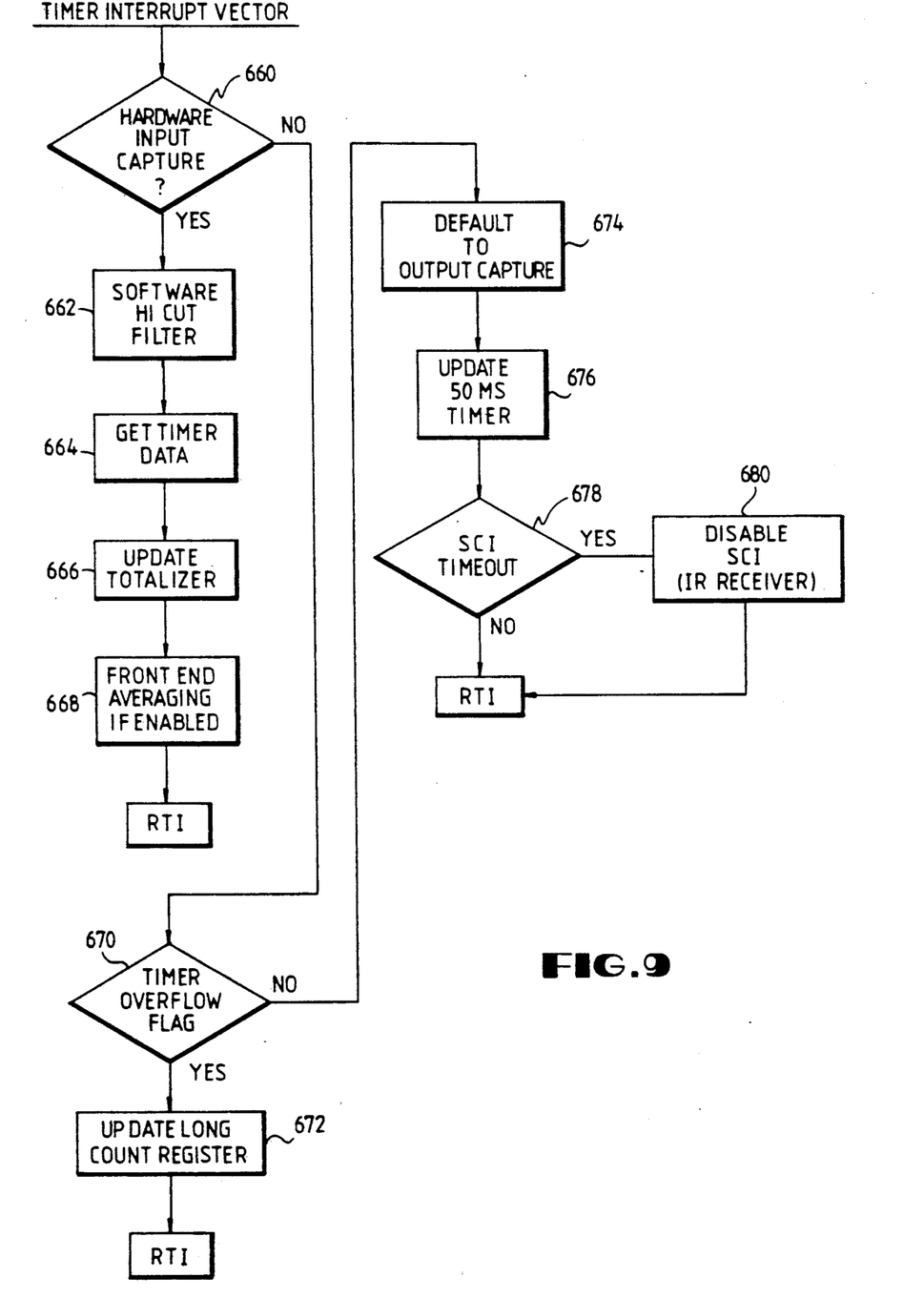
FIG. 9 is a flow chart illustrating the operation of the software timer function of the microprocessor.

Referring still to FIG. 7, if it is time to update the display, the microprocessor checks to determine whether the meter has received a an external hardware signal indicative of the quantity being measured 624. This signal is referred to as an input capture within the interrupt vector routine (FIG. 9). If no such signal is ready, the microprocessor determines whether such a signal is past due 626. If so, the microprocessor clears the LCD display to avoid displaying erroneous data 628, clears all variables to indicate an error condition 630, and returns to the beginning of the routine. If the input capture signal is not past due, the microprocessor simply returns to the beginning of the routine to await the arrival of an input capture signal.

If an input capture signal is ready, the microprocessor proceeds to calculate and display a new rate. Thus, it retrieves the period of time since the last rate calculation 632, scales the input capture data by a software-selectable (FIG. 11) "K" factor to adjust the display to desired units of measure 634, and if the software-selectable (FIG. 11) averaging function is enabled, averages the new rate data with previous rate data 636. The resulting new rate then is delivered to the LCD display 638, and the routine returns to the beginning again to await expiration of the time for a new update.

Figure 8:
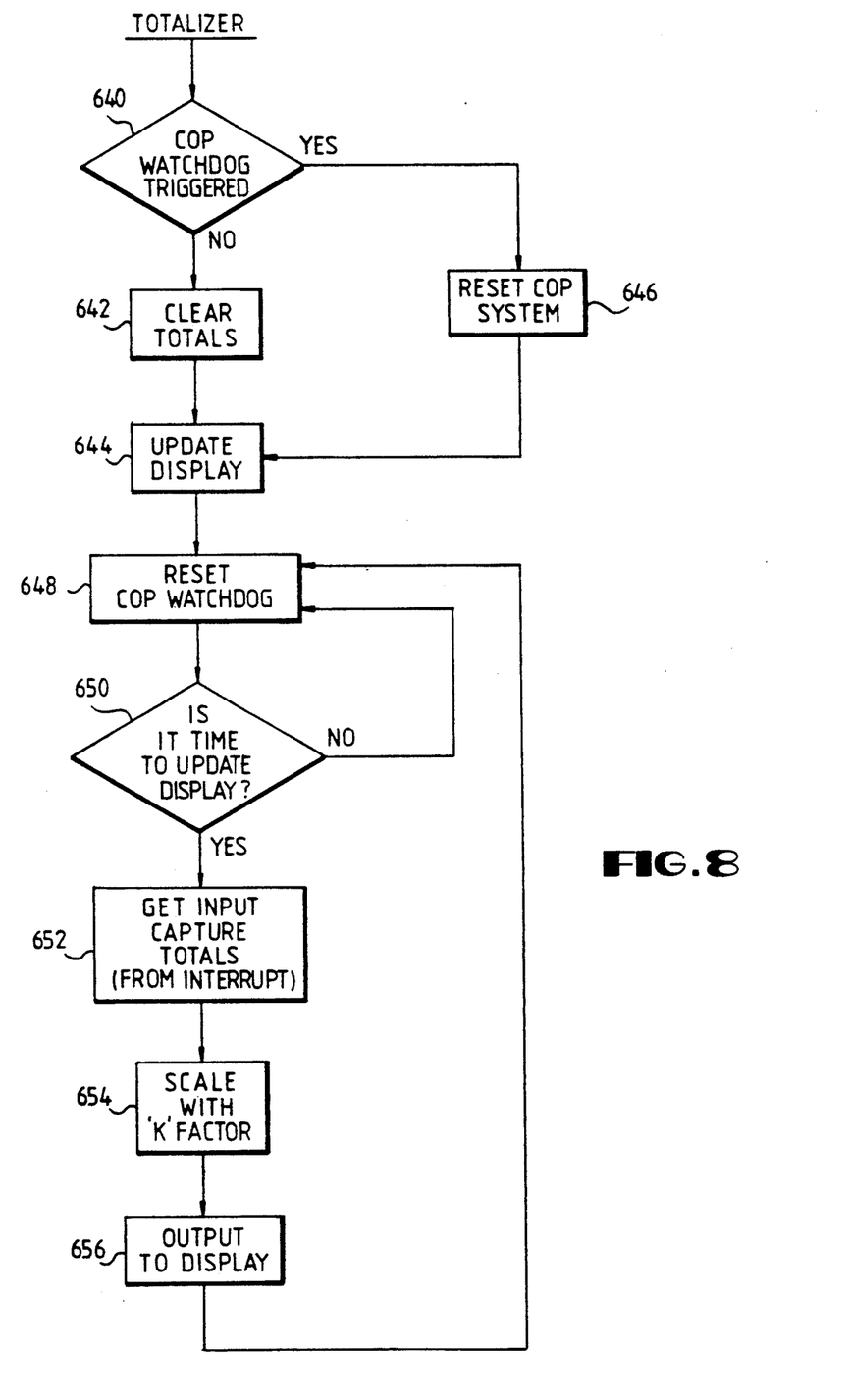
FIG. 8 is a flow chart describing the manner in which the microprocessor of the electronic processing system is programmed to operate in the totalizer mode.

FIG. 8 is a flow chart describing operation of the totalizer mode of the meter. If the totalizer mode of operation is selected (FIG. 11), the microprocessor first steps through a power-up sequence, in which the system determines if the watchdog has been triggered 640. If not, the accumulated totals within the microprocessor are cleared to begin to accumulate new totals 642 and the display is updated immediately with a zero 644. If the watchdog system has been triggered, the watchdog system is reset 646, and the microprocessor commences totalizer operation with existing totals.

Normal continuous operation of the totalizer mode commences with resetting the watchdog system 648. The system then determines whether the software-selectable (FIG. 11) period for updating the display has expired 650. If not, the system simply resets the watchdog and awaits expiration of the period. When the period has expired, the microprocessor retrieves the accumulated total from the input capture signal made available by the timer interrupt routine (FIG. 9) 652, scales it according to the selected K factor 654, delivers the new total to the display 656, and returns to the point of the routine where normal operation of the totalizer mode commences.

FIG. 9 is a flow chart showing operation of the timer interrupt routine. When the timer interrupt routine is triggered, the microprocessor first checks to determine whether it was triggered by the receipt of a hardware signal ("input capture") from the external transducer to which the meter is connected 660. If so, the signal is software-filtered to eliminate responses to erroneous signals 662, timer data is retrieved to fix the time of receipt of the signal 664, the accumulated total is updated 666, front end averaging occurs 668, if enabled, and the timer interrupt routine exits.

Referring still to FIG. 9, if the timer interrupt was not initiated by an input capture, the microprocessor checks to see if it was triggered by an overflow on the free running timer 670. If so, the microprocessor increments a "long count" register to indicate that the timer has overflowed 672, and the interrupt routine exits.

Finally, with respect to the timer interrupt routine in FIG. 9 if the interrupt was not triggered by either an input capture or a timer overflow flag, the microprocessor assumes that the timer interrupt was triggered by an "output capture" timer 674. The microprocessor then updates a 50 millisecond timer 676 and checks to determine whether the optical receiver has been enabled for more that one minute 678. If so, the microprocessor disables the optical receiver 68 and exits the timer interrupt routine. If not, the microprocessor simply exits the timer interrupt routine.

Figure 10:
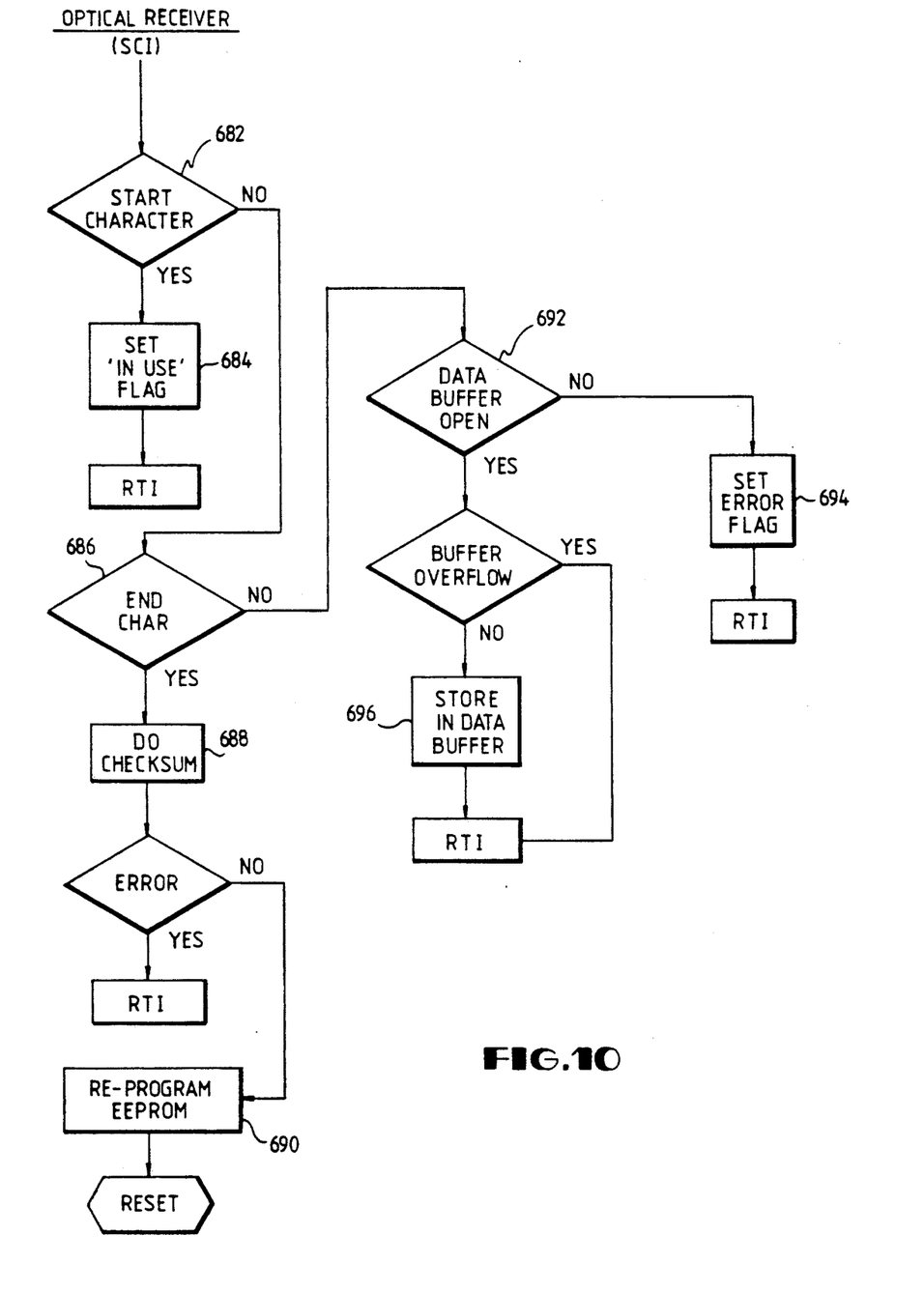
FIG. 10 is a flow chart illustrating the operation of the software that handles processing of signals received at the optical receiver of the electronic processing system.

FIG. 10 is a flow chart showing the preferred mode of operation of a interrupt routine dedicated to the optical receiver. Thus, the optical receiver interrupt routine commences with receipt of an optical signal. The microprocessor checks to see whether the signal received is a start character on the ASCII data string used to program the software selectable features of the meter 682. (FIG. 11 describes the preferred embodiment of the ASCII data string.) If so, the microprocessor sets a flag indicating that the optical receiver is in use and exits the interrupt routine.

If the optical signal received is not a start character, the microprocessor checks to determine if it is an end character on the ASCII data string 686. If so, the microprocessor performs a checksum to validate the data received 688, and if no error is found, reprograms the EEPROM with the new data string 690. If the optical signal is neither a start character nor an end character, and the "in use" flag is set, the microprocessor assumes that the optical signal is a part of the data string and checks to see if the data buffer is open for receipt of the incoming data string 692. If the data buffer is not open, the microprocessor sets an error flag 694 and exits the routine. If the data buffer is open, the microprocessor stores the data in the buffer 696 unless the buffer is already full, and exits the routine.

While a preferred embodiment of the invention has been shown and described, modifications thereof can be made by one skilled in the art without departing from the spirit of the invention.

TABLE I

| QTY. READ | MANU-FACTURER | PART OR IDENTIFYING NO. | NOMENCLATURE OR DESCRIPTION | MATERIAL/SPECIFICATION | ITEM NO |
|---|---|---|---|---|---|
| 5 | | | WIRE LEADS | 7 IN LG. 20 AWG. TEFLON INSULATION | W1-W5 |
| 1 | LXD | 4-4R3F03KG | LCD DISPLAY | 4 DIGIT | DS1 |
| 1 | VACTEC | VIT3622 | OPTICAL RECEIVER | IR FILTERED | Q1 |
| 1 | NATIONAL | LM2931AZ-5.0 | VOLTAGE/REGULATOR | | Q4 |
| 2 | MOTOROLA | MSP2222A | TRANSISTOR | PLASTIC | Q2, Q3 |
| 4 | AMIDON | FB-43-101 | FERRITE BEAD | 30-600 MHZ | LX1, 2 LX3, 4 |
| 3 | | 1N4007 | DIODE | 1KV | D5, 6 D7 |
| 2 | GI | SA20CA | TRANSZORB, 20V | | PK1, PK2 |
| 1 | | RC07GF183J | RESISTOR | 18K OHMS, ¼ WATT | R17 |
| 1 | | RC07GF106J | RESISTOR | 10 MEGOHMS, ¼ WATT | R16 |
| 1 | | RC07GF472J | RESISTOR | 4,700 OHMS, ¼ WATT | R13 |
| 1 | | RC07GF911J | RESISTOR | 910 OHMS, ¼ WATT | R12 |
| 1 | | RC07GF681J | RESISTOR | 680 OHMS, ¼ WATT | R11 |
| 1 | | RC07GF103J | RESISTOR | 10K OHMS, ¼ WATT | R10 |
| 1 | | RC07GF123J | RESISTOR | 12K OHMS, ¼ WATT | R9 |

TABLE I-continued

| QTY. READ | MANU-FACTURER | PART OR IDENTIFYING NO. | NOMENCLATURE OR DESCRIPTION | MATERIAL/SPECIFICATION | ITEM NO |
|---|---|---|---|---|---|
| 1 | | RC07GF105J | RESISTOR | 1 MEG, ¼ WATT | R1 |
| 1 | | RC07GF184J | RESISTOR | 180K OHMS, ¼ WATT | R8 |
| 2 | | RC07GF473J | RESISTOR | 47K OHMS, ¼ WATT | R7, R14 |
| 1 | | RN60D1002FS | RESISTOR | 10K OHMS | R6 |
| 1 | | RN60D2432FS | RESISTOR | 24.3K OHMS | R5 |
| 2 | | RLR20C3320FS | RESISTOR | 332 OHMS | R4, R15 |
| 1 | | RC07GF222J | RESISTOR | 2.2K OHMS | R3 |
| 1 | CORNING | RLR20C10R0FS | RESISTOR | 10 OHM | R2 |
| 2 | | CKR05BX180KS | CAPACITOR | 18pF | C10 C11 |
| 1 | | CKR05BX102KS | CAPACITOR | .001MFD | C6 |
| 1 | SPRAGUE | 199D106X0025C81 | CAPACITOR | 10MFD | C5 |
| 1 | SPRAGUE | 199D107X06R3DA1 | CAPACITOR | TANTALUM, 100MFD | C4 |
| 3 | | CKR06BX105KS | CAPACITOR | 1MFD | C3, 8, C9 |
| 1 | | CKR05BX471KS | CAPACITOR | 470pF | C1 |
| 1 | QUALITY | MCT6R2 | OPTOCOUPLER | HI REL | U3 |
| 1 | XICOR | X24LC01S1 | MEMORY, EEPROM | SURFACE MOUNT | U5 |
| 1 | GE | V227A2 | MOV, 22V | | VZ |
| 1 | M-TRON | MP-1UP4MHZ | CRYSTAL, 4MHZ | | X1 |
| 1 | MOTOROLA | MC68HC705C8CS | MICROCONTROLLER | 8 BIT, HC MOS, S & S SOFTWARE | U2 |
| 1 | MOTOROLA | MC145453P | DISPLAY DRIVER | | U1 |
| 4 | HEWLETT PACKARD | HLMP-2350 | BACKLIGHT, LED | | D1, 2 D3, 4 |
| 2 | | | MACHINE SCREW | PAN HEAD, CRES, 6-32UNC-2A, ¼LONG | 5 |
| 2 | PCC | C30061 | SPACER | NYLON #6, ¼ THICK | 4 |
| 2 | PCC | C33009 | THREADED SPACER | NYLON, 6-32 THD, ¼ LONG | 3 |
| 2 | AUGAT | 510-AG91D-20 | SOCKET STRIP | | 2 |

What is claimed is:

1. A meter, comprising:
optically programmable means for accumulating totals of a measured quantity;
means for displaying totals accumulated by said programmable means; and
optically transparent housing means in the form of a transparent aliphatic resin or epoxy resin molded around and completely encapsulating said programmable means and said displaying means, said programmable and displaying means being embedded in said housing means.

2. A meter according to claim 1, further comprising means for programming said accumulating means.

3. A meter according to claim 2 wherein said programming mans comprises an optical receiver adapted for detecting optical signals communicated through said housing means by an optical transmitter such that no physical contact need be made between the housing and the optical transmitter.

4. A meter according to claim 1, wherein said housing means comprises an enclosure formed by encapsulating said programmable means and said displaying means within a transparent body, said enclosure being adapted for mounting in a control panel.

5. An encapsulated meter for use in a harsh environment, comprising:
a programmable microprocessor for calculating rates of change of a measured quantity;
an optical receiver for receiving programming signals from an optical transmitter and sending programming signals to said microprocessor;
an electronic display for displaying rates calculated by said microprocessor; and
a housing of optically transparent epoxy molded completely around and sealing said microprocessor, said optical receiver and said electronic display from the harsh environment, said microprocessor, optical receiver, and electronic display being embedded in and in contact with said epoxy to provide structural support therefor.

6. A meter according to claim 5 further comprising means for programming said microprocessor.

7. A meter, comprising:
programmable means for accumulating totals of a quantity and providing an output signal;
means for displaying a quantity in response to said output signal from said programmable means;
means for completely encapsulating said programmable and displaying means in a durable, transparent aliphatic resin or epoxy resin in a manner which allows the meter to be read, reprogrammed, and operated indefinitely without necessitating removing the encapsulation and which completely and directly seals the programmable and displaying means against all contact with substances exterior of the meter; and
means for programming said programmable means optically through said encapsulating means.

8. A totalizer/rate for processing information signals from an external transducer, comprising:
an electronic processing system including
a printed circuit board having a plurality of electrical wires,
a display driver,
a programmable microprocessor for processing the information signals and communicating electrical signals to said display driver,
an electronic display powered by said display driver, and
an optical receiver for sending data to said microprocessor,
said display driver, microprocessor, electronic display and optical receiver electrically connected to said printed circuit board;
an integral optically transparent housing in the form of a transparent aliphatic resin or epoxy resin molded around and completely encapsulating and sealing said electronic processing system with said wires extending externally of said housing;

a connector strip electrically connected to said wires and thus to said printed circuit board, said connector strip being mounted externally to said housing and adapted to receive the information signals from the external transducer whereby the information signals are conducted via said wires to said circuit board and thence to said microprocessor; and said housing having an integral window with said optical receiver facing said window and adapted to receive optical signals to reprogram said microprocessor.

9. The totalizer/rate meter of claim 8, wherein said window protrudes from said housing to be received within a cutout in an instrument panel.

10. The totalizer/rate meter of claim 8, further including internally threaded inserts molded into said housing for the attachment of said housing to an instrument panel.

11. The totalizer/rate meter of claim 10 wherein said inserts have a pull strength of at least 200 lbs.

12. The totalizer/rate meter of claim 8 wherein said housing includes a rear face having four tapered surfaces.

13. The totalizer/rate meter of claim 8 wherein said housing includes a recess for receiving said connector strip.

14. The totalizer/rate meter of claim 13 wherein said recess is sized to accommodate connector pins extending from said connector strip.

15. The totalizer/rate meter of claim 8 wherein said housing includes an aperture for said wires, said aperture being sealed with silicon sealant.

16. The totalizer/rate meter of claim 8 wherein said resin is a high impact, aliphatic epoxy resin.

17. The totalizer/rate meter of claim 8 wherein said printed circuit board includes a copper foil layer for limiting radio frequency and electromagnetic interferences.

18. The totalizer/rate meter of claim 8 wherein said microprocessor operates either in a totalizer mode or a rate mode and receives a series of digital pulses via said connector strip from the transducer.

19. The totalizer/rate meter of claim 18 wherein said microprocessor converts said impulses to a measured quantity which is communicated to said display driver which updates said electronic display.

20. The totalizer/rate meter of claim 8 wherein said optical receiver is adapted to receive optical signals from an optical transmitter and communicate the signals to said microprocessor.

21. The totalizer/rate meter of claim 8 wherein said electronic display is a liquid crystal digital display.

22. An optically programmable totalizer/rate meter, comprising:

an optically programmable meter, comprising;
  means for receiving metering signals from an external transducer;
  means for accumulating totals of a measured quantity based on said metering signals;
  a connector strip for connection of said accumulating means to said external transducer;
  a programmable microprocessor for processing totals accumulated by said accumulating means and generating information relating to rates and totals therefrom;
  means for receiving optical programming signals from an external optical transmitter for programming said microprocessor; and
  a liquid crystal display for displaying the information generated by said microprocessor;
said optically programmable meter embedded in an integral transparent epoxy housing molded around the completely encapsulating said meter, said housing including a front face and a rear face having four tapered surfaces and being otherwise adapted for attachment into an instrument panel; and
wires extending from said accumulating means through said housing to said connector strip, for electrical connection of said accumulating means to said connector strip.

23. The meter of claim 22 wherein said meter is capable of operating in either a totalizer or a rate mode.

* * * * *